United States Patent [19]
Bayart et al.

[11] Patent Number: 5,497,264
[45] Date of Patent: Mar. 5, 1996

[54] REGULATED OPTICAL AMPLIFIER

[75] Inventors: Dominique Bayart, Clamart; Bertrand Clesca; José Chesnoy, both of Paris, all of France

[73] Assignee: Alcatel N.V., Rijswijk, Netherlands

[21] Appl. No.: 371,396

[22] Filed: Jan. 11, 1995

[30]     Foreign Application Priority Data

Jan. 13, 1994 [FR] France ................... 94 00321

[51] Int. Cl.$^6$ ........................................ H01S 3/00
[52] U.S. Cl. .............................. 359/337; 359/341
[58] Field of Search ..................... 359/341, 177, 359/106, 337

[56]             References Cited
           U.S. PATENT DOCUMENTS 5,363,385  11/1994  Heidemann ................. 359/341 X
5,374,973  12/1994  Maxham et al. ................. 359/341

FOREIGN PATENT DOCUMENTS

0395277A1  10/1990  European Pat. Off. .
0517503A3  12/1992  European Pat. Off. .

OTHER PUBLICATIONS

French Search Report FR 9400321.

*Primary Examiner*—Mark Hellner
*Attorney, Agent, or Firm*—Sughrue, Mion, Zinn, Macpeak & Seas

[57]             ABSTRACT

An amplifying optical fiber amplifies a plurality of wavelength-multiplexed carrier waves. The invention enables the gain as seen by each of the carrier waves to be maintained, in particular when the total input power varies. For that purpose, amplified spontaneous "reverse" emission light is servo-controlled in power. After being filtered in a filter and detected by a photodiode, said light controls the powering current supplied to two laser diodes for pumping the fiber. The invention applies in particular to implementing optical transmission networks.

4 Claims, 1 Drawing Sheet

# REGULATED OPTICAL AMPLIFIER

The present invention relates to regulating the gain of an optical amplifier having a doped fiber or waveguide.

BACKGROUND OF THE INVENTION

Conventionally, the gain of such an amplifier is controlled via an electrical current. The current powers a "pump" optical source which supplies a "pump" wave for exciting the doping elements of the fiber. Known amplifiers include servo-control loops for regulating their gain. Such a loop measures the power of light radiated or amplified by the amplifier, said power being representative of the gain of the amplifier, and it being possible for said light to be referred to as "regulation light". The loop then compares the representative power with a reference power. Finally, it controls the powering current supplied to the pump source so as to limit or cancel the difference between the two powers.

In a first known amplifier, the regulation light is spontaneous emission light that is radiated transversely by the amplifying fiber. The first known amplifier is described in Document EP-A 517 503 (NTT).

In many industrial applications, that amplifier suffers from the drawbacks that the regulation light must be filtered, and that the power of the light as measured by a detector is both very low and also very sensitive to small variations in the situation of the detector relative to the fiber, and this disturbs regulation.

In a second known amplifier, the regulation light is spontaneous emission light which is guided and amplified by the amplifying fiber, and which is tapped at the output of that fiber. Therefore, the light has propagated along the fiber in the same direction as the signal to be amplified, and it may be called "codirectional".

The second known amplifier is described in Document EP-A-395 277 (STC-PLC). It suffers from the drawback that regulation light must be carefully filtered so that the measured power is not modified by the fact that the detector receives a portion of the light from the amplified signal. Such careful filtering increases the cost and the size of the amplifier.

OBJECTS AND SUMMARY OF THE INVENTION

An object of the present invention is to regulate the gain of an optical amplifier more simply.

To this end, the invention provides a regulated optical amplifier including an amplifier waveguide and a servo-control loop for servo-controlling the power of an amplified spontaneous emission that is amplified and guided by the amplifier waveguide, wherein the emission whose power is servo-controlled is a "reverse" emission.

BRIEF DESCRIPTION OF THE DRAWING

An embodiment of the present invention is described in more detail below by way of non-limiting example and with reference to the diagrammatic figures of the accompanying drawing. When the same element is shown in both figures, it is designated by the same reference. In the accompanying drawing.

MORE DETAILED DESCRIPTION

Figure 1:
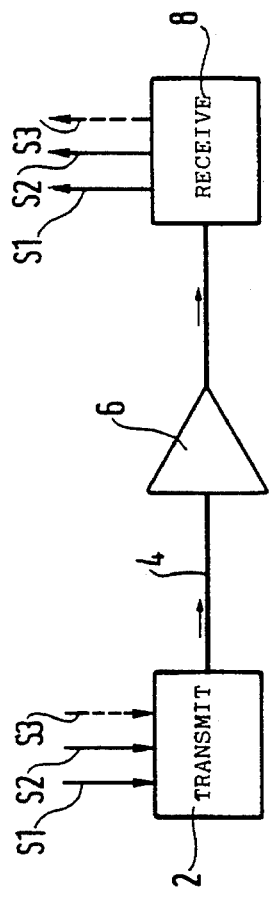
FIG. 1 is a view of an optical link including an amplifier of the present invention.
Figure 2:
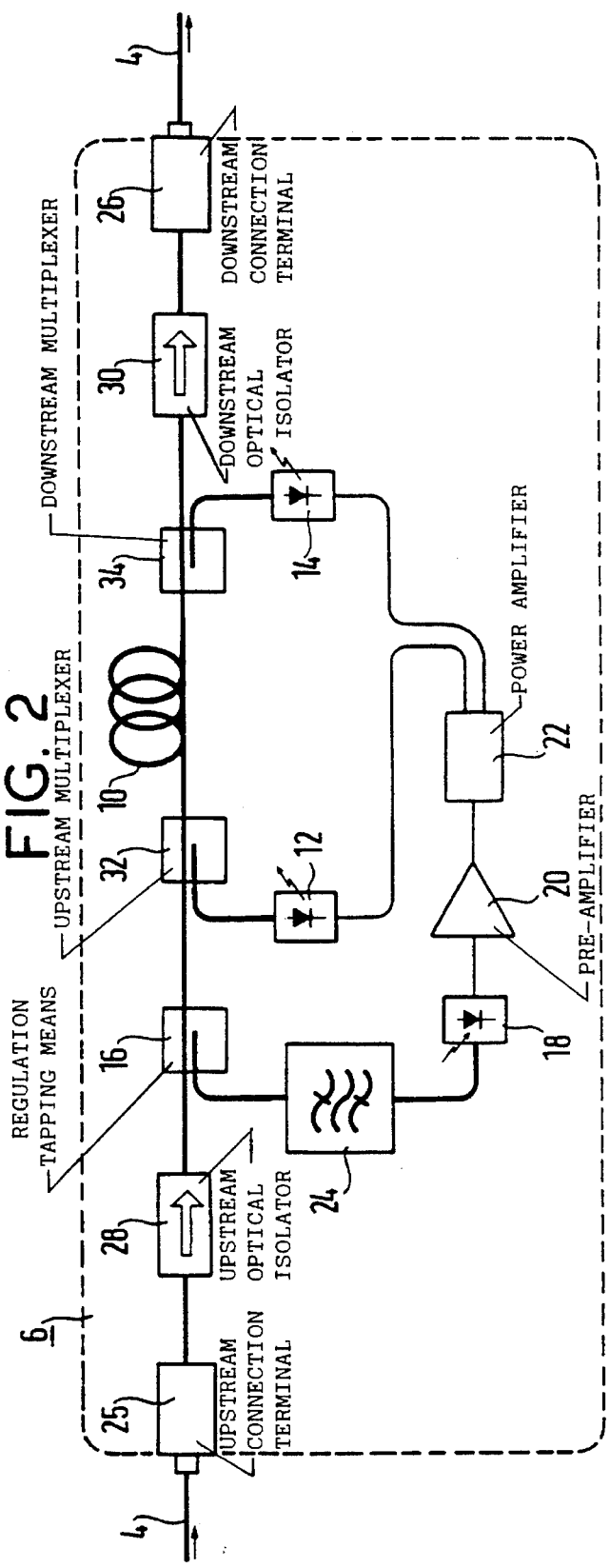
FIG. 2 is a view of the amplifier of the link shown in FIG. 1.

As shown in FIG. 1, and as known, an optical link includes the following elements:

A transmitter assembly 2. The transmitter assembly simultaneously receives a plurality of signals to be transmitted S1, S2, S3. The number of the signals may vary, and signal S3 may be temporarily absent. The transmitter assembly 2 responds by simultaneously transmitting a plurality of optical-type carrier waves carrying the signals in a plurality of distinct spectrum bands. The spectrum bands comprise a plurality of link channels. The carrier waves occupy some of those channels, thereby constituting busy channels. The signals to be transmitted, the carrier waves, and the busy channels correspond to one another, respectively.

An optical line 4. The line receives the carrier waves and guides them together in the form of a spectrum multiplex.

An amplifier 6 is inserted in the line 4 and amplifies the multiplex. In this way, each carrier wave receives amplification. The gain of the amplification constitutes a gain of the channel that corresponds to the carrier wave.

A receiver assembly 8 receives the carrier waves at the output of the line 4. The receiver assembly responds by restoring the signals to be transmitted.

The amplifier 6 includes the following elements:

An amplifier waveguide 10 inserted in series in the line 4. The amplifier waveguide passes the multiplex in a forward direction. For example, the amplifier waveguide is constituted by a doped optical fiber. When it is excited by a pump wave, the doping element applies amplification to said multiplex. Typically, the doping element is constituted by erbium ions $Er^{+++}$. The gain of the amplification depends on a controlled characteristic of the pump wave, which characteristic is typically the power of the wave. However, the amplifier waveguide may also be constituted by a monocrystal semiconductor chip. In which case, it is inserted in the chip between two confinement layers having opposite conductivity types. Pump action enabling amplification to be applied to the multiplex is then constituted by the fact that a powering current injects charge carriers into the amplifier waveguide from the two confinement layers.

A pump source performing the pump action, supplying the pump wave. In which case, the pump source is typically constituted by two laser diodes 12 and 14 that emit at a wavelength of 1,480 nm, and that inject respective pump waves into the amplifier waveguide 10 via an upstream multiplexer 32 and via a downstream multiplexer 34. The pump source defines the controlled characteristic of the pump wave. In the case of a semiconductor optical amplifier, the pump source is an electricity source supplying the powering current to the amplifier.

Regulation tapping means. The regulation tapping means tap light from the amplifier waveguide 10, which light is amplified thereby. This light is referred to below as "regulation light". Typically, the tapping means are constituted by an optical coupler 16.

Pump drive means 18, 20, 22. The pump drive means receive the regulation light. They respond by driving said pump source 12, 14 so as to cause the controlled characteristic of the pump wave to take a value that ensures suitable amplification of the multiplex. Typically, the pump drive means are constituted by a photodiode 18 controlling an electronic amplifier. The electronic amplifier supplies power to the two diodes 12 and 14 constituting the pump source. The electronic amplifier is constituted by a preamplifier 20 and a power amplifier 22. In this way, the pump drive means servo-control the power of the regulation light.

In a known optical amplifier, the regulation light is tapped at the output of the amplifier waveguide, and said regulation light is constituted by a predetermined fraction of the amplified multiplex and of the output noise of the waveguide. The amplifier control means control the power of the pump wave so as to maintain constant the power of the regulation light. In this way, the total output power of the amplifier is maintained constant.

According to the present invention, the regulation tapping means 16 are disposed at the input of said amplifier waveguide 10. The gain regulation light is then constituted by an amplified spontaneous "reverse" emission, so called because it propagates in a backward direction that is opposite from said forward direction. The gain regulation light occupies a "regulation band" in the spectrum. "Regulation gain" is constituted by the mean gain presented by the amplifier waveguide in the regulation band. Servo-controlling the power of the regulation light then simultaneously servo-controls the regulation gain. In this way, it enables the gain of the amplifier to be servo-controlled simply and accurately in various spectrum bands that may or may not include the regulation band.

Preferably, the amplifier 6 further includes an optical filter 24 interposed between the regulation tapping means and the pump drive means 18, 20, 22 so as to limit the regulation band. For example, the wavelength spectrum range occupied by the channels of the link may extend from 1,530 nm to 1,560 nm, and the regulation band may extend from about 1,565 nm to about 1,570 nm. The regulation band is chosen so that the gain regulation light is affected as little as possible by variation in the input power.

In addition to the above-mentioned elements, the amplifier 6 includes an upstream connection terminal 25 and a downstream connection terminal 26, and an upstream optical isolator 28 and a downstream optical isolator 30.

We claim:

1. A regulated optical amplifier including an amplifier waveguide and a servo-control loop for servo-controlling the power of an amplified spontaneous emission that is amplified and guided by the amplifier waveguide, wherein the emission whose power is servo-controlled is a "reverse" emission, said amplifier including:

an amplifier waveguide for receiving and guiding light to be amplified propagating from an input to an output of said amplifier waveguide in a forward direction, said amplifier waveguide containing amplifier elements suitable for responding to pump action by applying amplification to said light, the gain of the amplification depending on a controlled characteristic of said pump action;

a pump source performing said pump action;

regulation tapping means for tapping light from said amplifier waveguide, which light is amplified thereby and constitutes regulation light; and pump drive means receiving said regulation light and responding by driving said pump source so as to cause said controlled characteristic of the pump action to take a value that ensures desired amplification of said light to be amplified;

wherein said regulation tapping means are disposed at the input of said amplifier waveguide, said regulation light being constituted by an amplified spontaneous reverse emission propagating in a backward direction that is opposite from said forward direction.

2. An amplifier according to claim 1, further including an optical filter interposed between said regulation tapping means and said pump drive means so as to limit a regulation band occupied in the spectrum by said regulation light.

3. An amplifier according to claim 2, wherein said regulation band is chosen so as to limit parasitic variations in power that occur in said regulation light in response to variations in the power of said light to be amplified received by said amplifier.

4. An amplifier according to claim 3, in which a wavelength spectrum range occupied by said light to be amplified extends from 1,530 nm to 1,560 nm, and said regulation band extends from about 1,565 nm to about 1,570 nm, said amplifier waveguide being an erbium-doped optical fiber, and said pump action being optical pumping.

\* \* \* \* \*